United States Patent Office 3,139,434
Patented June 30, 1964

3,139,434
10-SUBSTITUTED YOHIMBANES
John Shavel, Jr., Mendham, N.J., assignor to Warner-Lambert Pharmaceutical Company, Morris Plains, N.J., a corporation of Delaware
No Drawing. Filed June 27, 1961, Ser. No. 119,829
1 Claim. (Cl. 260—287)

The present invention relates to new and novel alkaloid derivatives of the yohimbane series having the formula:

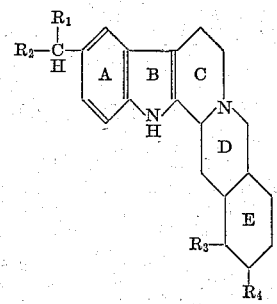

wherein $R_1$ is hydrogen or hydroxyl, $R_2$ is an alkyl radical having 1 to 5 carbon atoms, $R_3$ is hydrogen or carbomethoxy and $R_4$ is hydrogen or a radical of the formula —$OR_5$ in which $R_5$ is hydrogen, the acyl radical of an aliphatic carboxylic acid containing 1 to 6 carbon atoms, benzoyl or benzoyl nuclearly substituted with 1 to 3 halo, lower alkyl or lower alkoxy groups. This invention also relates to new and novel methods of preparing these compounds and to their pharmaceutically acceptable non-toxic acid addition and quaternary ammonium salts.

The terms "lower alkyl" and "lower alkoxy" as used herein refer to straight and branched chain aliphatic groups containing 1 to 6 carbon atoms.

The compounds of this invention bear the A, B, C, D and E rings as depicted in the above structural formula and are, generally, alkaloids of the yohimbane series. Depending upon the configuration of the hydrogen atom at the 3-position and the existence of cis or trans fusion of the D and E rings, four different configurations are possible, that is yohimbane, 3-epiyohimbane, alloyohimbane and 3-epialloyohimbane. The present invention includes within its scope derivatives of these four families of alkaloids bearing the substituents at the 10, 16 and 17 positions as noted in the above formula.

The new and novel compounds of my invention have interesting and significant pharmacological activity and are useful as analgesics and tranquilizers. These compounds are also valuable intermediates useful in the production of other compounds of the yohimbane series.

Among the compounds included within the scope of my invention are 10-ethylyohimbane, 10-butylyohimbane, 10-ethylyohimbine acetate, 10-ethylyohimbine benzoate, 10-ethylyohimbine propionate, 10-ethylyohimbine 3,4,5-trimethoxybenzoate 10-ethylyohimbine, 10-(α-hydroxyethyl)yohimbane, 10-(α-hydroxybutyl)yohimbane, 10-(α-hydroxypropyl)yohimbane acetate, 10-(α-hydroxyethyl)yohimbane acetate, 10-(α-hydroxyethyl)yohimbine benzoate, 10-(α-hydroxyethyl)yohimbine 3,4,5-trimethoxybenzoate, 10-(α-hydroxyethyl)yohimbine and the like.

I have now found that those compounds of my invention having the formula:

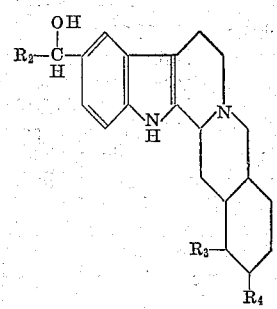

wherein $R_2$, $R_3$ and $R_4$ are as described hereinabove, may be prepared by treating a solution in an inert solvent of a starting material of the formula:

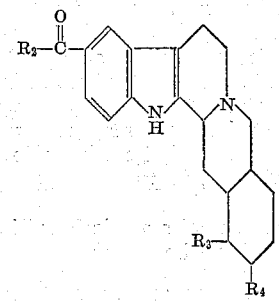

with an alkali metal borohydride, for example, sodium or potassium borohydride. The solvent used should be non-reactive with either the starting material or the product, as well as non-reactive with the alkali metal borohydride reducing agent. Anhydrous reaction conditions should be maintained with absolute ethanol being a generally preferred solvent. The reaction is carried out at about 15° C. to about 40° C. for about 15 to about 30 hours and thereafter the mixture is treated with water or dilute base and the precipitate, constituting the product, is purified by crystallization.

I have also found that the heating of a starting material of the above formula with hydrazine hydrate in the presence of an alkaline material results in the preparation of compounds of the formula:

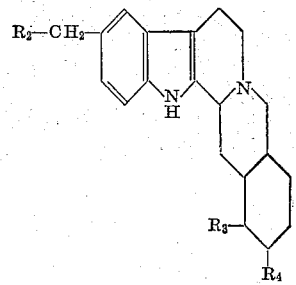

Alkali metal hydroxides and alcoholates, for example sodium hydroxide, potassium hydroxide, sodium ethylate, sodium methylate and the like are preferred alkaline materials. The solvent used should be inert, that is, non-reactive with any of the materials present in the reaction mixture and should preferably have a boiling point in excess of 200° C. It has been found that high boiling glycols, for example, diethylene glycol are preferred solvents for the reaction. The reaction mixture is refluxed until the alkaloid reactant goes into solution and is then boiled at atmospheric pressure until the internal temperature has reached between 175 and 210° C. The mixture is then poured onto crushed ice, extracted with chloroform and the finished product recovered from the extract by distillation and repeated recrystallizations.

The starting materials for use in the preparation of the new and novel compounds of my invention are 10-acylated derivatives of alkaloids of the yohimbane series. These starting materials are prepared as described in my copending application entitled "Alkaloid Derivatives of the Yohimbane Series and Process Therefor," Serial No. 88,303, filed February 10, 1961.

The compounds of this invention may be converted into their pharmaceutically acceptable non-toxic acid addition or quaternary ammonium salts. Useful acid-addition salts are those formed with such acids as maleic, fumaric, benzoic, succinic, methylsulfonic, sulfonic, citric, tartaric, salicylic, malic, cinnamic, hydrochloric, hydrobromic, phosphoric and the like. The acid addition salts may be prepared in the conventional manner, for example, by treating a solution or suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositories and the like.

The following examples are included in order further to illustrate the present invention:

EXAMPLE I

10-(α-Hydroxyethyl)Yohimbine Acetate

A solution of 10 g. 10-acetylyohimbine acetate in 100 ml. absolute ethanol is stirred at room temperature with 10 g. potassium borohydride for twenty hours. The stirring is continued six hours longer after the addition of 5 g. additional potassium borohydride. The reaction mixture is neutralized with acetic acid and the solvent removed by distillation in vacuo. The residue is dissolved in dilute acetic acid and reprecipitated by basification with ammonium hydroxide. The white precipitate is washed with water, dried, and crystallized from acetonitrile to give 10 g. of material, M.P. 184–189° dec., $[\alpha]_D^{25}$ +44° (pyridine, c.=0.38). Recrystallization from acetone yields 7.3 g. of product, M.P. 187–193° dec., $[\alpha]_D^{25}$ +63° (pyridine, c.=0.5). Another recrystallization from acetonitrile gave 5.7 g. of 10-(α-hydroxyethyl)yomibine acetate as the monohydrate, M.P. 187–190° dec., $[\alpha]_D^{25}$ +62° (pyridine, c.=0.67).

Analysis.—Calc. C, 65.48; H, 7.47; N, 6.11. Found C, 65.42; H, 7.61; N, 5.99.

EXAMPLE II

10-Ethylyohimbane

A mixture of 17 g. 10-acetylyohimbane, 6 g. potassium hydroxide, 90 ml. hydrazine hydrate, and 240 ml. diethylene glycol is refluxed until the 10-acetylyohimbane is completely dissolved. The resulting solution is then distilled at atmospheric pressure until the internal temperature rises to 197°. The residual solution is poured onto crushed ice, extracted with chloroform, and distilled to dryness. The gummy residue is dissolved in dilute acetic acid and the solution is then basified with ammonium hydroxide and extracted with chloroform. The chloroform solution is dried over sodium sulfate and distilled to dryness to give a gum which on crystallization from acetonitrile gives 4.2 g. of material, M.P. 180–194° dec. An additional 2 g. of crystalline material, M.P. 163–165° dec. is obtained by evaporation of the mother liquor, dissolving the residue in dilute acetic acid, precipitation of the hydrochloride by the addition of saturated ammonium chloride solution, crystallization of the hydrochloride from ethanol, basifying with ammonia, extracting with chloroform, evaporation to dryness, and crystallization from acetonitrile. The combined material is recrystallized from acetone to give 2.5 g. of 10-ethylyohimbane as the hemihydrate, M.P. 187–192° dec. $[\alpha]_D^{25}$ —82° (pyridine, c.=0.68).

Analysis.—Calc. C, 79.45; H, 9.21; N, 8.83. Found C, 79.40; H, 9.10; N, 8.77.

Throughout the specification, all temperatures are given in degrees centigrade.

It is understood that the foregoing detailed description is given merely by way of illustration and that many variations may be made therein without departing from the spirit of my invention.

Having described my invention, what I desire to secure by Letters Patent is:

10-(α-Hydroxyethyl)yohimbine acetate.

References Cited in the file of this patent

UNITED STATES PATENTS

| | | |
|---|---|---|
| 2,796,420 | Weisenborn | June 18, 1957 |
| 2,857,385 | Kuehne | Oct. 21, 1958 |
| 3,022,310 | Diassi | Feb. 10, 1962 |

FOREIGN PATENTS

| | | |
|---|---|---|
| 949,471 | Germany | Sept. 20, 1956 |
| 1,199,433 | France | June 22, 1959 |
| 1,256,524 | France | Feb. 13, 1961 |

OTHER REFERENCES

Royals: Advanced Org. Chem., Prentice-Hall Inc., Englewood Cliffs, N.J., (1954), pages 111–113, QD 251. R68.

MacPhillamy et al.: Jour. Amer. Chem. Soc., vol. 77 (1955), p. 4337.

Van Tamelen et al.: Jour. Amer. Chem. Soc., vol. 78 (1956), page 4629, QD 1 A5.

Theilheimer II: Syn. Method of Org. Chem., vol. 11 (1957), pages 27 and 28.

Diassi et al.: Jour. Amer. Chem. Soc., vol. 80 (1958), page 3746–3748.

Theilheimer I: Syn. Meth. of Org. Chem., vol. 14 (1960), page 20.